United States Patent
Christian

(10) Patent No.: US 12,546,653 B2
(45) Date of Patent: *Feb. 10, 2026

(54) ADAPTIVE OPTICAL ANALYZER WITH AUTOMATIC DRIFT CONTROL AND HIGH DYNAMIC RANGE

(71) Applicant: Neolitics, Inc., Sparrows Point, MD (US)

(72) Inventor: Sean M. Christian, Sparrows Point, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,911

(22) Filed: Jul. 20, 2021

(65) Prior Publication Data

US 2022/0113188 A1    Apr. 14, 2022

Related U.S. Application Data

(63) Continuation of application No. 15/977,425, filed on May 11, 2018, now Pat. No. 11,067,444.

(60) Provisional application No. 62/504,942, filed on May 11, 2017.

(51) Int. Cl.
*G01J 3/18* (2006.01)
*G01J 3/02* (2006.01)
*G01J 3/12* (2006.01)
*G01J 3/26* (2006.01)

(52) U.S. Cl.
CPC ............... *G01J 3/18* (2013.01); *G01J 3/0208* (2013.01); *G01J 3/021* (2013.01); *G01J 3/26* (2013.01); *G01J 2003/1217* (2013.01)

(58) Field of Classification Search
CPC .. G01J 3/18; G01J 3/0208; G01J 3/021; G01J 3/26; G01J 2003/1217; G01J 2003/1213; G01J 3/12; G01J 3/0291; G01J 3/0294; G01N 21/27
USPC ........................................................ 356/326
See application file for complete search history.

(56) References Cited

U.S. PATENT DOCUMENTS

| | | | |
|---|---|---|---|
| 8,390,806 B1* | 3/2013 | Subramanian ........ | G01J 3/0259 356/301 |
| 2005/0148834 A1* | 7/2005 | Hull ..................... | A61B 5/0059 600/317 |
| 2008/0309930 A1* | 12/2008 | Rensen ................. | G01J 3/36 356/300 |
| 2010/0231905 A1* | 9/2010 | Christian ............... | E21B 49/081 356/300 |
| 2011/0108721 A1* | 5/2011 | Ford ..................... | G01J 3/06 73/152.55 |
| 2012/0038928 A1* | 2/2012 | Saari .................... | G01J 3/32 356/454 |

\* cited by examiner

*Primary Examiner* — Md M Rahman

(57) ABSTRACT

A spectroscope includes a light source, at least one static optical element for manipulating or structuring light, at least two adaptive optical elements and at least one detector. The at least two adaptive optical elements are configured to partition an optical function of spectral sorting from at least one of the following optical function: routing, attenuation, and/or encoding. The light source, the at least one static optical element, and the at least two adaptive optical elements are configured to direct light from the light source into first and second distinct light channels, the first light channel containing a sample to be analyzed.

20 Claims, 8 Drawing Sheets

Light Source-Lens-Sample-Lens-Slit-Grating-Order Sorting Filter-AOE$_{\text{all functions}}$-Grating-Lens-Detector
  1           2      3      4    5     6              7                    8              9      10    11

Light Source-Lens-AOE$_{sorting}$-AOE$_{routing,\ encoding,\ attenuation}$-Sample-Lens-Detector
    21        22     23     24                    25   26   27

ADAPTIVE OPTICAL ANALYZER WITH AUTOMATIC DRIFT CONTROL AND HIGH DYNAMIC RANGE

This application is a continuation of U.S. patent application Ser. No. 15/977,425 filed 11 May 2018, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of spectroscopy and spectrum analysis, and in particular to a spectroscope using adaptive optical elements and distinct light channels. In an embodiment, the invention includes a device for optical or other spectral measurement that utilizes an Adaptive Optical Element (AOE) such as a Micro Mirror Array (MMA), a Piezo-Electric Mirror (PEM), or Fabry Perot Interferometer (FPI) to provide real-time scaling or normalization by providing a sample and reference channel.

BACKGROUND

Spectroscopes such as spectrophotometers, spectrometers, spectrofluorometers, or spectrum analyzers are used in numerous situations to detect and provide the spectral characteristics of a Sample Under Test (SUT). These characteristics can then be used to provide an analysis of the composition of the sample for scientific or industrial analysis. Because of the ability of a spectroscope to provide information on a broad range of samples and sources, they have seen use in a wide number of industries and activities ranging from police forensics to scientific analysis to industrial monitoring. Unfortunately, spectroscopes are dependent on their ability to remain calibrated as they analyze or scan an SUT. Due to the fact that all spectroscopes are sensitive to changes in environmental conditions and prone to drift over time, they generally require constant operator interaction to adjust for differing situations and to continually check and/or re-establish calibration. For many industrial applications, this limits their commercial viability.

The present inventor's prior U.S. Pat. Nos. 7,719,680 and 7,440,098 are incorporated herein by reference in their entirety. In a recent innovation, the present inventor developed an optical system that addressed the issue of long-term drift within optical analyzers that utilized a single AOE which performed the function of both spectral sorting and routing for the purpose of real-time drift correction and signal normalization. While this innovation is likely the first industrially viable innovation in twenty years in the field of spectroscopy, it is limited in its ability to probe weak optical signals due to the number of optical elements required to spectrally sort, route, encode, and attenuate each spectral band. It is further limited in its ability to analyze signals with High Dynamic Range (HDR) while maintaining a high Signal-to-Noise Ratio (SNR), due to the fact that the spectrally sorted bands are simultaneously imaged on the MMA which restricts the number of available mirrors per spectral band that can be used for real-time attenuation.

SUMMARY

A spectroscope designed to utilize at least two Adaptive Optical Elements (AOEs) and at least two distinct light channels and their associated detector or detectors, where at least one AOE is utilized for spectral sorting and at least one AOE is utilized for light routing, spectral encoding, or spectral attenuation, or any combination thereof, between at least two distinct light channels. With the AOEs operating in concert, the innovation allows for real-time and near real-time scaling and normalization of light signals that drift with respect to time or changes in environmental stimuli and it allows for optimization of light signals whose spectral features require an optical system with high Signal-to-Noise Ratio (SNR) over a photometric dynamic range exceeding four decades.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the preferred embodiment, the innovation separates the functions of light sorting and routing by utilizing an FPI for spectral sorting, coupled with an MMA for spectral routing and attenuation between two independent light channels. The first light channel is interfaced with a SUT while the second light channel is left open or is interfaced with a stable calibration standard. In the preferred embodiment, the light is spectrally sorted (i.e., filtered) by the FPI and routed by the MMA prior to interfacing with the sample (i.e., a pre-dispersive light analyzer). In the preferred embodiment, the spectrally sorted light is collimated and imaged on the MMA across more than one micro-mirror, so that the MMA can perform the function of an optical attenuator in addition to a spectral router.

Figure 1:
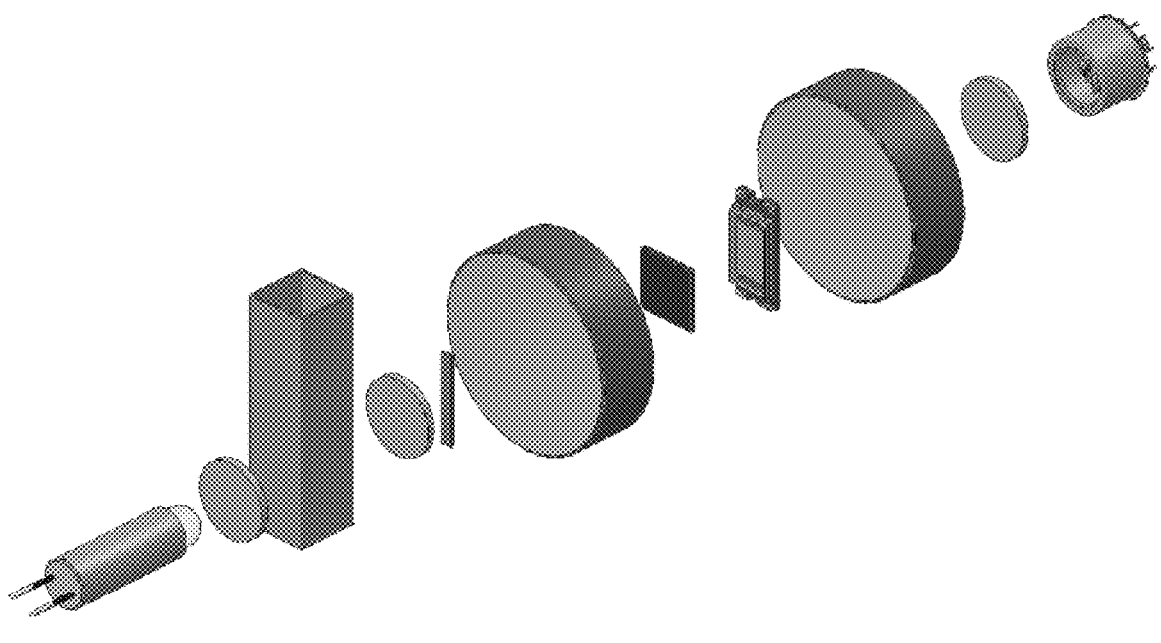
FIG. 1 illustrates a post-dispersive embodiment in accordance with a prior innovation.

In FIG. 1, a system in accordance with an embodiment of the prior invention is shown. In this embodiment, a single AOE performs the optical functions of spectral sorting, routing, encoding, and attenuation. The optical path in accordance with the embodiment shown in FIG. 1 is as follows. Light exits the light source 1, passes through a lens 2, passes through a sample 3, passes through a second lens 4, passes through a slit 5, passes through a grating 6, passes through an order-sorting filter 7, passes through an AOE 8 that performs all optical functions, passes through a grating 9, passes through a second lens 10, and finally impinges upon a detector 11.

In separating the functions of sorting and routing, the present innovation allows for the configuration of a system with significantly greater dynamic range.

Figure 2:
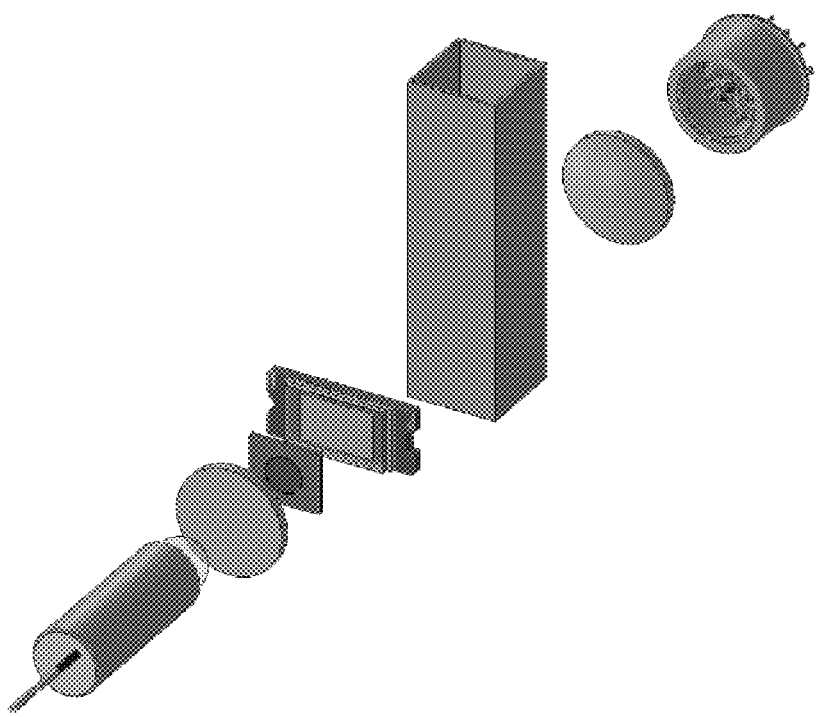
FIG. 2 illustrates a pre-dispersive embodiment in accordance with the present invention.

FIG. 2 shows a system in accordance with an embodiment of the present invention. The optical path in accordance with the embodiment shown is as follows. Light (which can be broadband or narrowband) exits the light source 21, passes through a lens 22, passes through a first AOE 23 that is configured for sorting, passes through a second AOE 24 that is configured for routing, encoding, and/or attenuation, passes through the sample 25, passes through a second lens 26, and impinges on the detector 27. As an alternative to the lens 22, or in addition to it, the present invention may use a slit and a grating, a mask and a grating, or a mirror. The AOE may be, e.g., a piezo-electric mirror, a Fabry-Perot interferometer, or a dynamic grating such as a silicon grating light-valve or a piezo-electric tiltable grating. The AOE may comprise a mechanically actuated bulk optical device such as a rotating filter wheel or a scanning monochromator.

The present innovation can provide a significant increase in sensitivity and a two-to-three order of magnitude increase in its ability to attenuate (i.e., scale) an input with HDR. In the embodiment shown in FIG. 2, the system's ability to expand its dynamic range by two to three orders of magnitude is a direct result of separating the optical functions of spectral sorting and light routing through the use of more than one AOE.

FIG. 3 shows elements of both a single AOE and dual AOE embodiment. The figure illustrates how separating the optical functions of spectral sorting and routing physically extends the dynamic range of a spectroscope by over three decades.

Figure 3A:
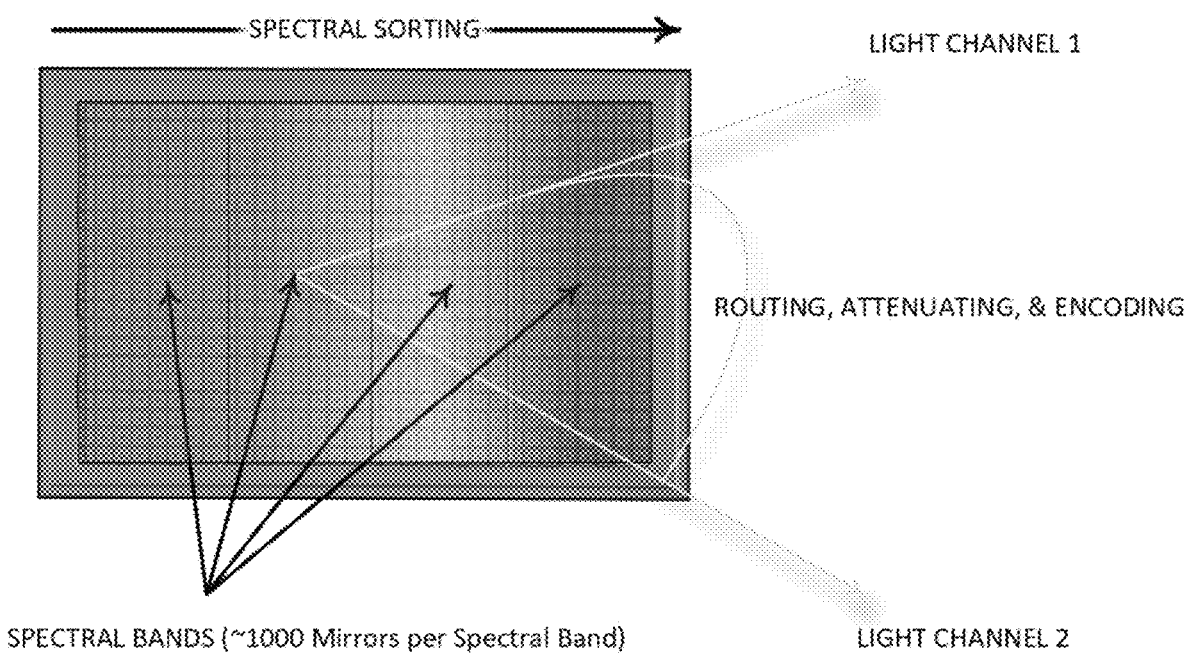
FIGS. 3A and 3B illustrate the present invention's enhanced ability to attenuate light over one of the present inventor's prior innovations.
Figure 3B:
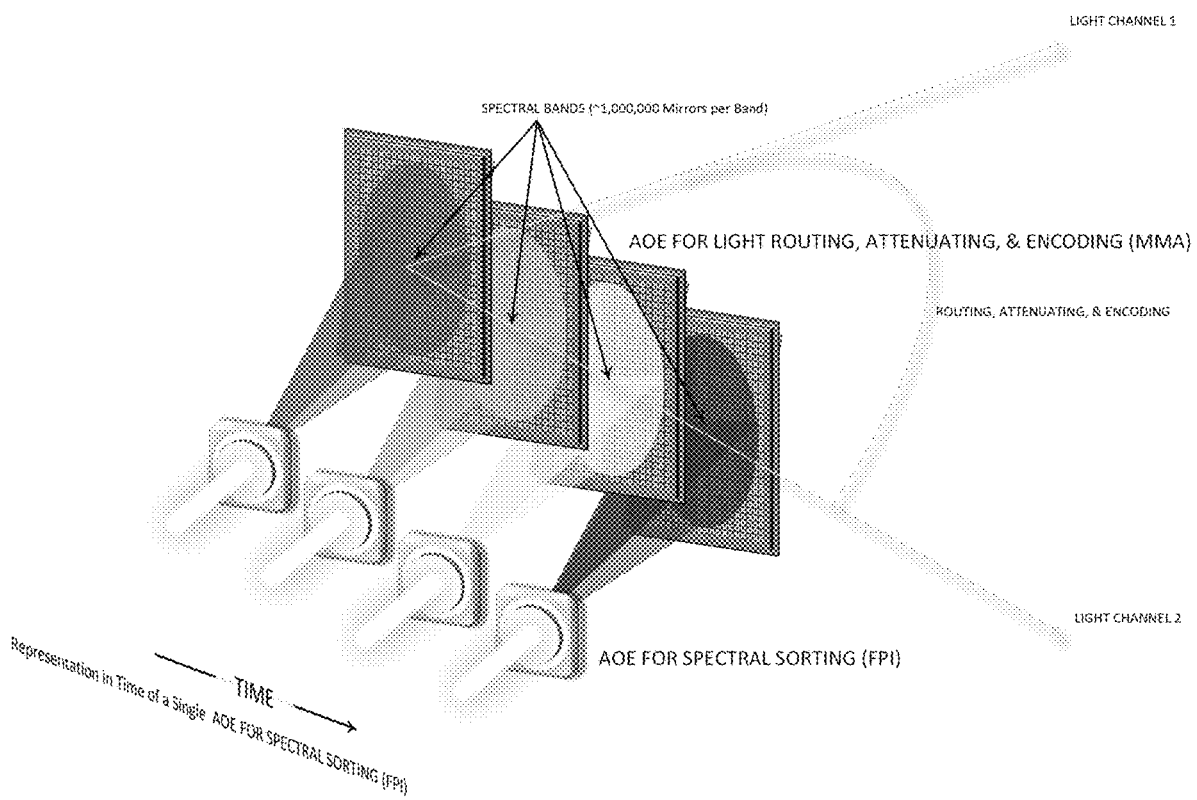
Figure 4:
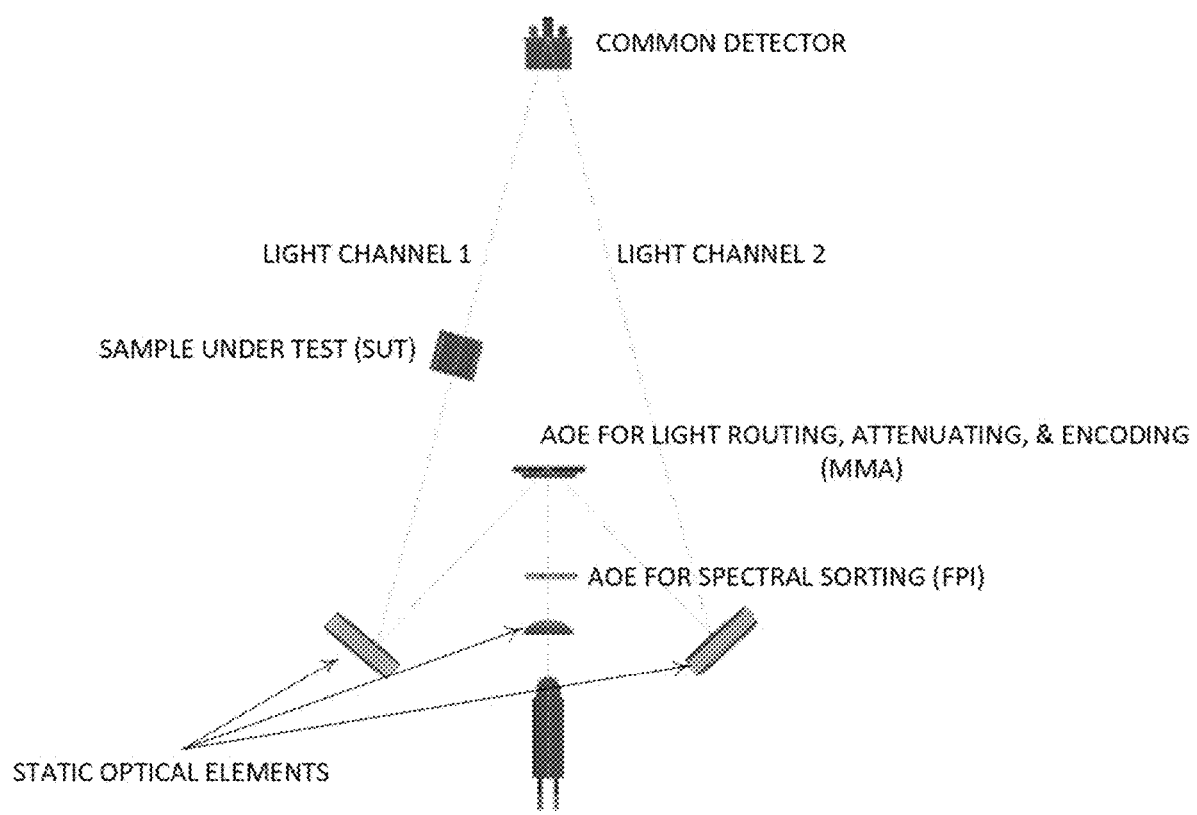
FIG. 4 illustrates an alternative pre-dispersive embodiment of the presently disclosed invention which utilizes a common detector for each light channel.

Additionally, FIGS. 3A and 3B demonstrate how isolating the optical functions of spectral sorting and routing may allow for the creation of a spectral analyzer that could potentially analyze a significantly larger number of spectral channels than the device of FIG. 1, whose ability to spectrally sort light into spectral bands is physically limited by the size and architecture of the AOE. FIG. 3A illustrates how a single AOE of the prior innovation implemented the optical functions of sorting, attenuating, and routing. FIG. 3B illustrates how two AOEs of the present invention partition of the optical functions of sorting, attenuating, and routing to significantly enhance the spectroscopes ability to attenuate light over the prior innovation.

Figure 5A:
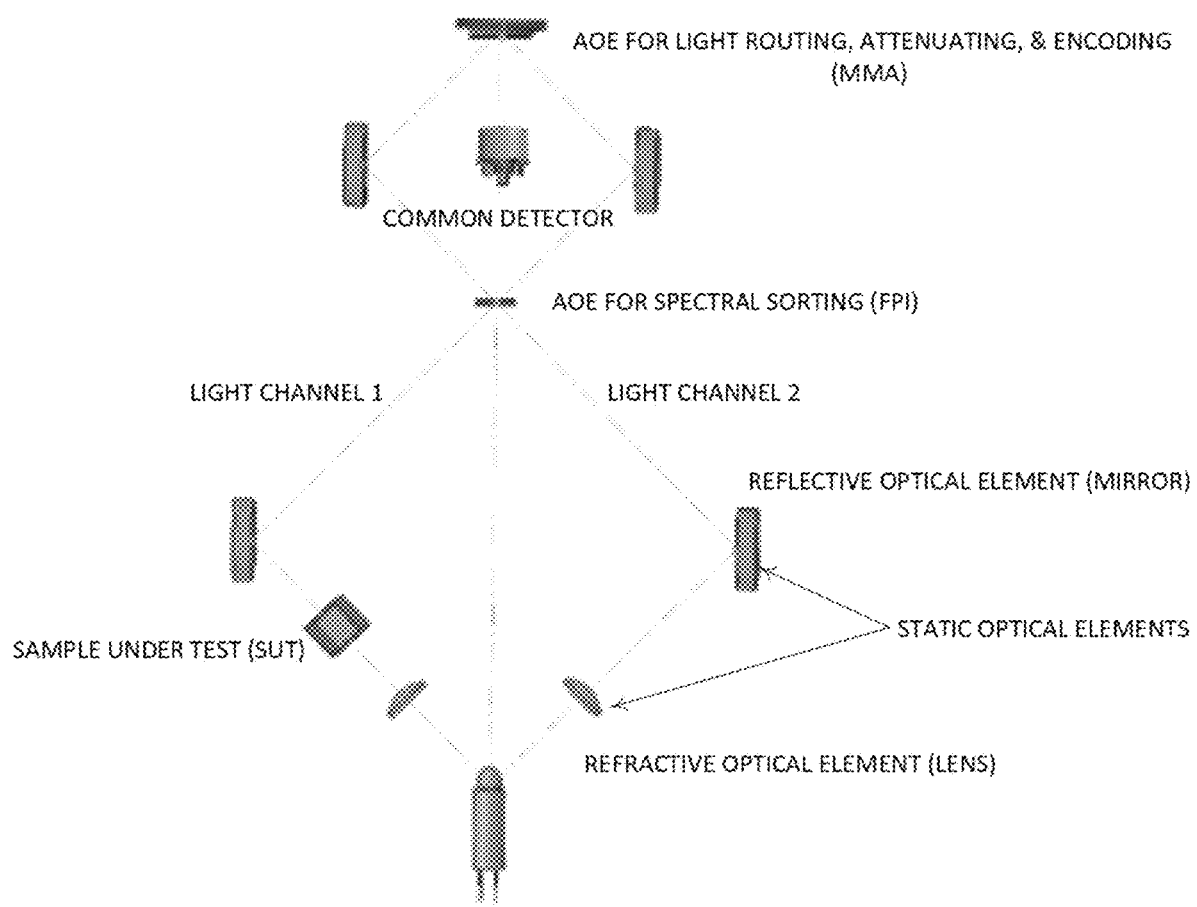
FIG. 5A illustrates alternative post-dispersive embodiments of the presently disclosed invention which utilizes a common detector for each light channel.
Figure 5B:
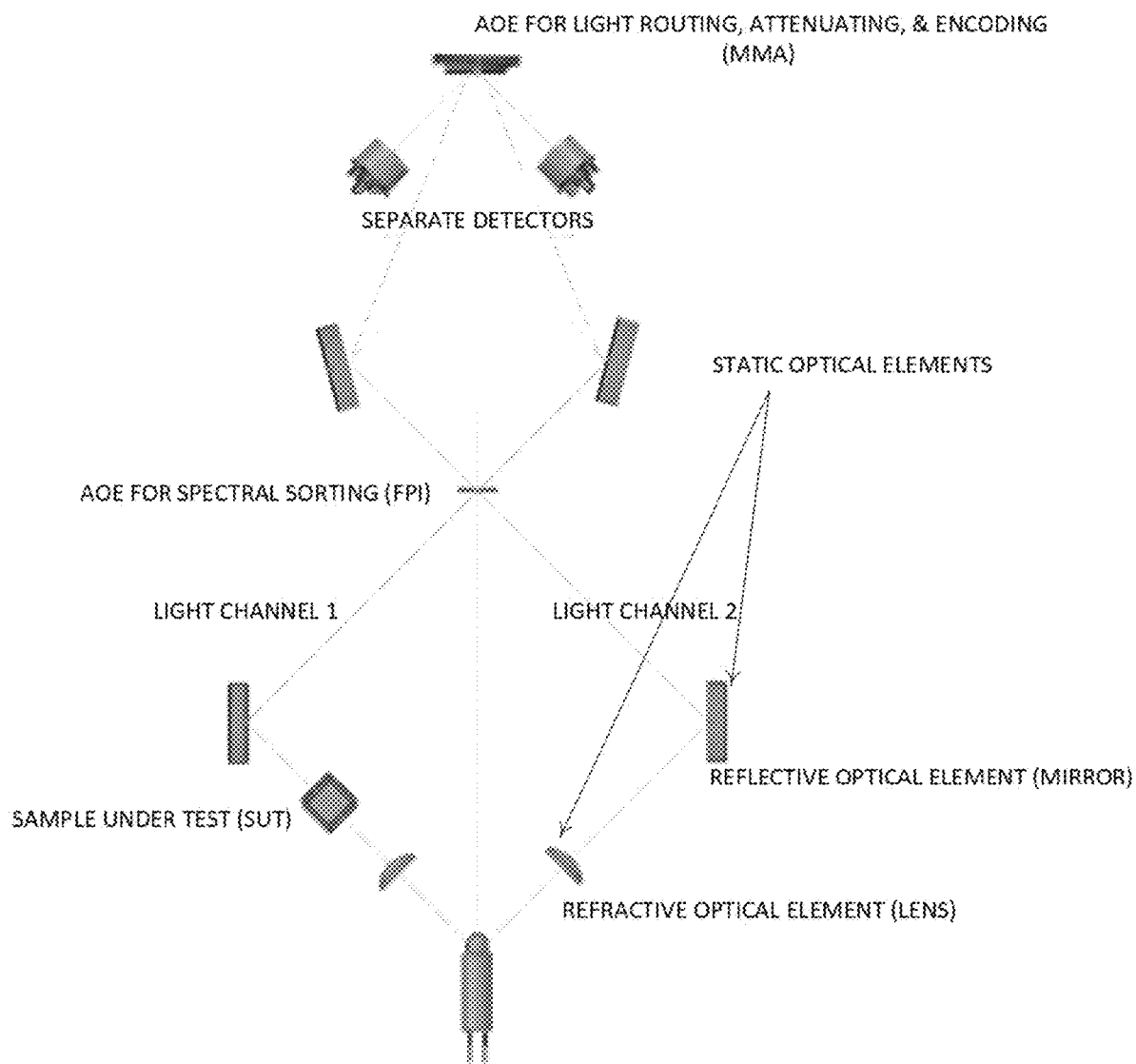
FIG. 5B illustrates alternative post-dispersive embodiments of the presently disclosed invention which utilizes separate detectors for each light channel.

While the preferred embodiment of FIG. 2 is pre-dispersive, it is possible to provide a post-dispersive design that utilizes the present innovation. Single detector and dual detector post-dispersive embodiments are shown in FIGS. 5A and 5B, respectively.

Figure 6A:
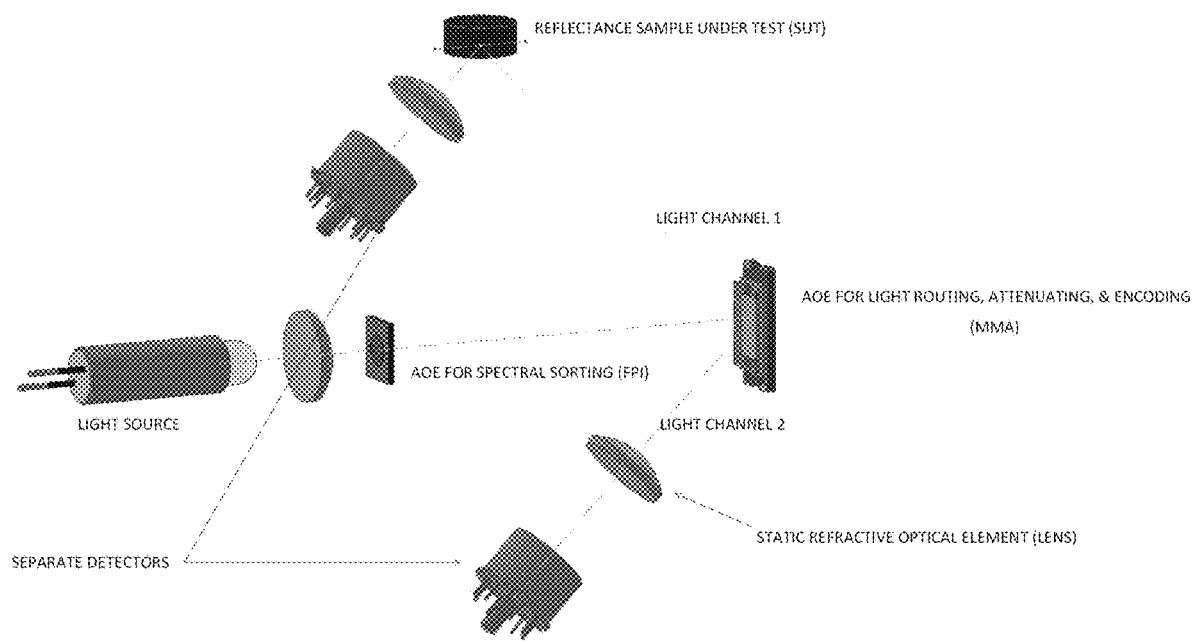
FIG. 6A illustrates an embodiment of a pre-dispersive implementation of the disclosed invention which utilizes separate detectors for each light channel for reflectance spectroscopy.
Figure 6B:
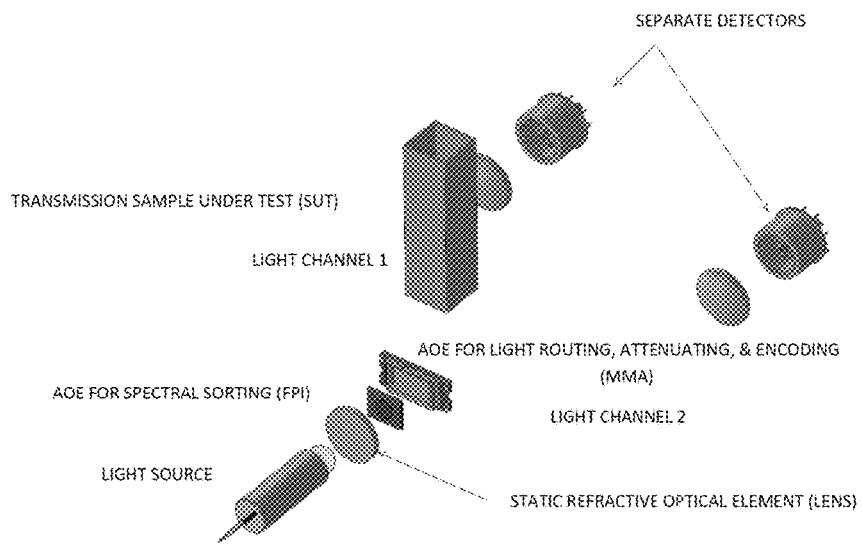
FIG. 6B illustrates a simplified embodiment of a pre-dispersive implementation of the disclosed invention which utilizes separate detectors for each light channel for transmission spectroscopy.

FIG. 6A illustrates an embodiment of a pre-dispersive implementation of the disclosed invention which utilizes separate detectors for each light channel for reflectance spectroscopy. FIG. 6B illustrates a simplified embodiment of a pre-dispersive implementation of the disclosed invention which utilizes separate detectors for each light channel for transmission spectroscopy.

Those skilled in the art will recognize that with the present innovation, since the MMA is no longer required to spectrally sort light, can simultaneously or serially route spectral bands into both light channels of a two-detector embodiment, or simultaneously or serially route and encode spectral bands into both light channels of a single detector embodiment.

Further, those skilled in the art will recognize that a third AOE, such as a single element PEM could be used for independent Pulse Width Modulation (PWM) encoding of spectral bands and achieve a comparable result with respect to attenuation and routing.

The invention claimed is:

1. A spectroscope, comprising:
   a light source emitting a light beam having a spectrum;
   at least one static optical element for manipulating or structuring light;
   at least two adaptive optical elements configured to partition an optical function of spectral sorting from at least one optical function selected from the group: routing, attenuation, or encoding; and, at least one detector;
   wherein said light source, said at least one static optical element, and said at least two adaptive optical elements are configured to direct light from the light source into first and second distinct light channels, the first light channel containing a sample to be analyzed;
   wherein the dynamic grating comprises a silicon grating light-valve or a piezo-electric tiltable grating.

2. The spectroscope of claim 1, wherein said at least one detector comprises at least two detectors and the at least two adaptive optical elements are configured to route spectral bands into both of said first and second light channels.

3. The spectroscope of claim 1, wherein said at least one detector comprises a single detector and the at least two adaptive optical elements are configured to route and encode spectral bands into both of said first and second light channels.

4. The spectroscope of claim 1, wherein the light source is a broadband source.

5. The spectroscope of claim 1, wherein the light source is a narrowband source.

6. The spectroscope of claim 1, wherein the second light channel does not include a sample to be analyzed.

7. The spectroscope of claim 6, wherein an output from said second light channel is used as a reference for an output of any other distinct light channel.

8. The spectroscope of claim 1, wherein the at least one static optical element comprises a slit and a grating.

9. The spectroscope of claim 1, wherein the at least one static optical element comprises a mask and a grating.

10. The spectroscope of claim 1, wherein the at least one static optical element comprises a refractive optical element.

11. The spectroscope of claim 10, wherein the refractive optical element comprises a lens.

12. The spectroscope of claim 1, wherein the at least one static optical element comprises a reflective optical element.

13. The spectroscope of claim 1, wherein the reflective optical element comprises a mirror.

14. The spectroscope of claim 1, wherein the adaptive optical element comprises a micro mirror array.

15. The spectroscope of claim 1, wherein the adaptive optical element comprises a piezo-electric mirror.

16. The spectroscope of claim 1, wherein the adaptive optical element comprises a Fabry-Perot interferometer.

17. The spectroscope of claim 1, wherein the adaptive optical element comprises a dynamic grating.

18. The spectroscope of claim 1, wherein the adaptive optical element is a mechanically actuated bulk optical device.

19. The spectroscope of claim 18, wherein the mechanically actuated bulk optical device comprises a rotating filter wheel.

20. The spectroscope of claim 18, wherein the mechanically actuated bulk optical device comprises a scanning monochromator.

\* \* \* \* \*